US012709999B2

(12) United States Patent
Purdum et al.

(10) Patent No.: US 12,709,999 B2
(45) **Date of Patent: *Aug. 18, 2026**

(54) REACTION TURBINE OPERATING ON CONDENSING VAPORS

(71) Applicants: Howard Purdum, Research Triangle Park, NC (US); William F. Purdum, Research Triangle Park, NC (US)

(72) Inventors: Howard Purdum, Research Triangle Park, NC (US); William F. Purdum, Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,207

(22) Filed: Jan. 23, 2024

(65) Prior Publication Data

US 2024/0209755 A1 Jun. 27, 2024

Related U.S. Application Data

(63) Continuation-in-part of application No. 17/831,204, filed on Jun. 2, 2022, now Pat. No. 11,898,469.

(Continued)

(51) Int. Cl.
*F01K 7/16* (2006.01)
*F01D 5/06* (2006.01)

(Continued)

(52) U.S. Cl.
CPC .................. *F01K 7/16* (2013.01); *F01D 5/06* (2013.01); *F01D 5/18* (2013.01); *F01K 7/223* (2013.01);

(Continued)

(58) Field of Classification Search
CPC . F01K 7/16; F01K 7/223; F01K 11/02; F01D 5/06; F01D 5/18; F05D 2210/12; F05D 2220/31; F05D 2240/242
See application file for complete search history.

(56) References Cited

U.S. PATENT DOCUMENTS 816,487 A 3/1906 Lumgair
986,308 A 3/1911 Ostergren (Continued)

FOREIGN PATENT DOCUMENTS

CN 110114555 A 8/2019
JP 2001-221004 A 8/2001

(Continued)

OTHER PUBLICATIONS

International Search Report and Written Opinion of the International Searching Authority for International Application No. PCT/US2022/031934, dated Mar. 22, 2023.

(Continued)

*Primary Examiner* — Hoang M Nguyen
(74) *Attorney, Agent, or Firm* — Birch, Stewart, Kolasch & Birch, LLP

(57) ABSTRACT

A reaction turbine operates on the heat released from the condensation of steam, combined with inherent steam pressure and temperature heads. A series of rotors, each containing multiple curved internal channels, provide compressive boosts between successive stages, while avoiding excessive self-compression. Compressive effects and shock waves generated within these channels provide high levels of condensation, thereby releasing immense amounts of heat. The resulting hot vapor and condensate droplets are then ejected tangentially at the periphery of the rotors to generate thrust. The exhaust steam from the last stage is then compressed and returned to the engine inlet to be mixed with the incoming fresh steam, thereby efficiently completing the system cycle without the need of large cooling towers for condensation.

20 Claims, 6 Drawing Sheets

Related U.S. Application Data

(60) Provisional application No. 63/196,375, filed on Jun. 3, 2021.

(51) Int. Cl.
*F01D 5/18* (2006.01)
*F01K 7/22* (2006.01)
*F01K 11/02* (2006.01)

(52) U.S. Cl.
CPC .......... *F01K 11/02* (2013.01); *F05D 2210/12* (2013.01); *F05D 2220/31* (2013.01); *F05D 2240/242* (2013.01)

(56) References Cited

U.S. PATENT DOCUMENTS

| | | | | |
|---|---|---|---|---|
| 1,131,386 | A | 3/1915 | Kerr | |
| 1,142,882 | A | 6/1915 | Johnson | |
| 1,798,566 | A | 3/1931 | Bossche | |
| 3,156,447 | A | 11/1964 | Takeda | |
| 3,758,224 | A | 9/1973 | Migneault | |
| 4,557,113 | A | 12/1985 | Silvestri, Jr. et al. | |
| 5,236,349 | A | 8/1993 | Fabris | |
| 5,341,768 | A | 8/1994 | Pope | |
| 9,255,478 | B2 * | 2/2016 | Purdum | F01D 1/16 |
| 11,898,469 | B2 * | 2/2024 | Purdum | F01K 11/02 |
| 2001/0007193 | A1 | 7/2001 | Kitz | |
| 2003/0033808 | A1 | 2/2003 | Schlote | |
| 2003/0068226 | A1 | 4/2003 | Anneken | |
| 2004/0062647 | A1 | 4/2004 | Garrett, III | |
| 2007/0098556 | A1 * | 5/2007 | Sanagi | F04D 29/282 416/182 |
| 2011/0185732 | A1 | 8/2011 | Eppendorfer et al. | |
| 2012/0063899 | A1 * | 3/2012 | Ikeda | F04D 29/245 416/185 |
| 2012/0141261 | A1 * | 6/2012 | Giovannetti | F04D 29/2227 415/203 |
| 2013/0009400 | A1 | 1/2013 | Pickard | |
| 2013/0101393 | A1 | 4/2013 | Purdum et al. | |
| 2013/0327010 | A1 | 12/2013 | Müller et al. | |
| 2015/0071781 | A1 * | 3/2015 | Kurihara | F01D 25/06 416/186 R |
| 2015/0118080 | A1 | 4/2015 | Dextraze | |
| 2015/0139781 | A1 | 5/2015 | Chang et al. | |
| 2020/0040737 | A1 | 2/2020 | Yokoyama et al. | |
| 2021/0115811 | A1 * | 4/2021 | Arakawa | F16C 23/045 |
| 2023/0250791 | A1 * | 8/2023 | Podhola | F03B 3/126 415/182.1 |

FOREIGN PATENT DOCUMENTS

| | | | |
|---|---|---|---|
| JP | 2005-188378 | A | 7/2005 |
| JP | 2007-535643 | A | 12/2007 |
| JP | 2014-530997 | A | 11/2014 |
| JP | 2018-48640 | A | 3/2018 |
| JP | 2018-534478 | A | 11/2018 |
| WO | WO2005/033476 | A1 | 4/2005 |

OTHER PUBLICATIONS

Japanese Office Action for Japanese Application No. 2023-573582, dated Oct. 29, 2024, with an English translation.

Japanese Notice of Allowance for Japanese Application No. 2023-573582, dated Feb. 12, 2025, with English translation.

Chinese Office Action and Search Report for Chinese Application No. 202280038544.X, dated May 1. 2026, with English translation of the Office Action.

Extended European Search Report for European Application No. 22842621.9, dated Apr. 29, 2026.

* cited by examiner

REACTION TURBINE OPERATING ON CONDENSING VAPORS

CROSS REFERENCE TO RELATED APPLICATIONS

This application is a continuation-in-part of U.S. patent application Ser. No. 17/831,204, filed Jun. 2, 2022, and claims the benefit of provisional application 63/196,375, filed Jun. 3, 2021, the contents of which are incorporated herein.

FIELD OF THE INVENTION

The present invention relates to a reaction turbine operating on vapor species as they condense to form liquids.

BACKGROUND OF THE INVENTION

Conventional steam turbines operate on the vaporization and condensation of water, as described by the Rankine cycle. First, heat from fossil fuel combustion, nuclear reactions, solar irradiation, or other source is added to water in a boiler, thereby raising the temperature of the water until steam is formed. Additional heat is then applied in a superheater, thus yielding an extremely hot, high pressure vapor with no remaining water droplets. This superheated steam then passes through a turbine, rotating a series of blades to produce shaft power. As power is extracted from the system, the steam cools and loses pressure. Eventually the steam begins to condense, yielding immense quantities of large water droplets. To prevent these droplets from damaging the delicate turbine blades, the power generation process is then stopped and the residual steam is exhausted to a cooling tower. The cooling tower rejects the remaining steam heat to the environment, thereby completing the condensation process. The resulting condensate is then returned to the boiler, thus completing the cycle.

In this configuration the system produces power only in the temperature range between the hot superheated steam at the turbine inlet and the onset of condensation at the cold turbine outlet. The system efficiency in this range is calculated from Carnot's basic relation: the temperature difference between the hot and cold limits divided by the temperature of the hot limit. Basic steam power plants have Carnot efficiencies of only about 36%, thereby wasting almost ⅔ of the incoming fuel.

The most common way to improve this poor efficiency is to raise the high temperature limit. Unfortunately, while advanced ultra-supercritical plants may eventually reach efficiencies of about 50%, such systems will be extremely expensive and difficult to operate. Alternatively, Carnot's relation suggests that lowering the exit temperature could also improve the plant's efficiency. Unfortunately, overall plant thermodynamics limit any such lowering to insignificant levels. It is therefore necessary to extend the plant's operational mode beyond the Carnot limits to achieve higher efficiencies. Specifically, it is necessary to harness at least some of the heat that is currently lost to condensation in conventional Carnot power plants.

The underlying principle behind this process is that the high speed steam near the exit zone experiences great temperature and pressure drops due to compressibility effects and rarefaction on the trailing side of shock waves. Immense amounts of condensation follow immediately, thereby releasing great amounts of heat to the remaining vapor. This released heat raises the temperature and pressure of the remaining vapor, thereby producing additional power in the subsequent stages.

Under this approach the total power output is the sum of the power produced in the conventional Carnot cycle, plus the power produced from the heat released during condensation. The overall efficiency is thus always greater than the efficiency of the conventional Carnot process alone. In practice, many operators already use this process to some extent by simply not stopping power generation precisely at the onset of condensation. Instead, the power generation process is allowed to continue until about 10% of the steam condenses, with the resulting blade damage tolerated for improved fuel economy.

The limiting factor in this technique is that turbines with even the best blade curvatures using the most advanced alloys can tolerate only relatively mild levels of condensation. Full utilization of condensation heat capture therefore requires a new turbine design that can withstand extreme erosion levels.

The markets for such a new turbine are immense. In terms of scale, the market for the new system spans the range from several kW up to hundreds of MW, thereby including household, automotive, industrial, and marine power applications. Because steam turbines currently provide 89% of the world's electricity, however, the most significant market is electrical power generation. To service this market, the system can first be configured as an extension of conventional steam turbines, replacing the cooling tower. This configuration provides a great deal more electricity for the same amount of fuel, while also eliminating the need for huge amounts of increasingly scarce, expensive cooling water. Such a retrofit to the existing infrastructure could readily be applied to at least partially meet the proposed 2030 CO2 emissions limits. Longer term, the ability to work near the condensation point would eliminate the need for high levels of superheating, thereby enabling the use of solar, geothermal, and other green sources that are inadequate to drive conventional steam turbines. Such systems could therefore be used for zero emissions power to meet 2050 $CO_2$ standards.

SUMMARY OF THE INVENTION

The present invention is a reaction turbine that operates on the heat released from the condensation of steam, combined with inherent steam pressure and temperature heads. A series of rotors, each containing multiple curved internal channels, provide compressive boosts between successive stages, while avoiding excessive self-compression. Compressive effects and shock waves generated within these channels provide high levels of condensation, thereby releasing immense amounts of heat. The resulting hot vapor and condensate droplets are then ejected tangentially at the periphery of the rotors to generate thrust. The exhaust steam from the last stage is then compressed and returned to the engine inlet to be mixed with the incoming fresh steam, thereby efficiently completing the system cycle without the need of large cooling towers for condensation.

DESCRIPTION OF THE INVENTION

Figure 1:
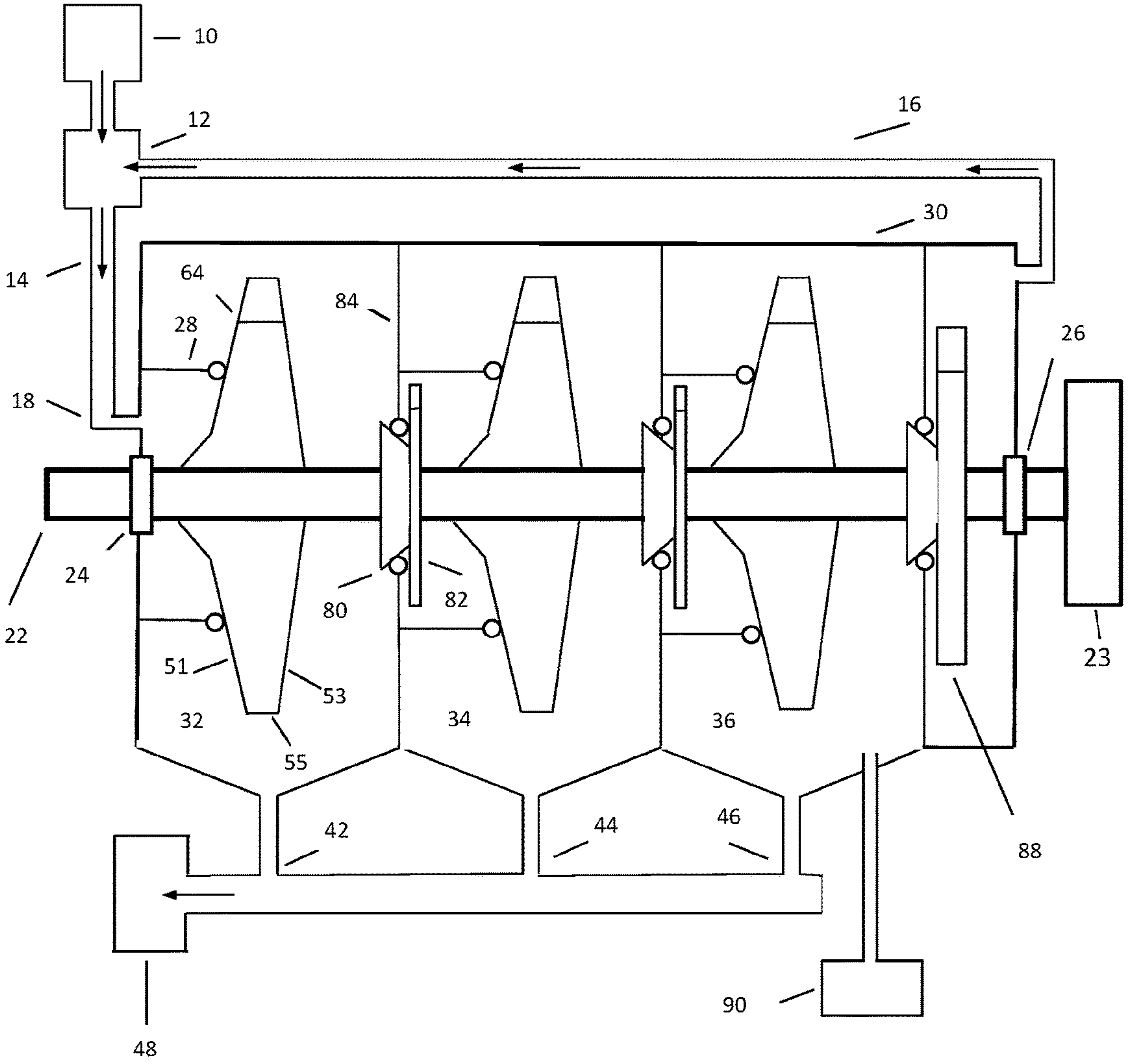
FIG. 1 is a horizontal cross section view of a system having a series of rotors.

FIG. 1 depicts the reaction turbine having three rotors within a housing 30, each stage having a rotor. Any suitable number of stages, including a single stage, can be used. The system uses a source of steam 10, which may be from any suitable source, including condensing exhaust from a conventional steam turbine, allowing the system to be added to an existing steam power plant. Another option is to pass high pressure steam from a boiler directly to the system to eliminate the need for a superheater and conventional steam turbine components.

The steam from incoming source 10 flows into a mixing chamber 12. The new steam is mixed with steam from conduit 16 that has been recycled from the exhaust of the system. As discussed later, the recycling process yields steam that is essentially at saturation conditions, containing a mixture of water droplets and vapor. The recycled steam quality is therefore less than 100%, much like the incoming source steam. Because the pressures, temperatures, and qualities of the new steam and the recycled steam are quite similar, the two flows can be readily combined in the mixing chamber 12. The resulting output of the mixing chamber therefore consists of a uniform mixture of water droplets and vapor at a steam quality that is slightly less than 100%.

Compared to the input steam of conventional turbines, the mixing chamber output is at relatively low pressure. The volume of the mixing chamber output is therefore relatively large, thereby requiring larger cross sectional flow areas than are found in conventional turbines. A solid shaft 22, has seals 24, 26 at the inlet and exit sides of the housing 30. The output from the mixing chamber 12 travels through conduit 14 and enters the housing 30 through port 18 in the housing. The vapor and droplet mixture fills the volume around the central shaft 22, extending to the rotor body. The rotor body has a first surface 51, a second surface 53 and an end wall 55 extending between the first surface 51 and the second surface 53. A horizontal partition 28 confines the vapor and droplet mixture between the housing and a first surface of the rotor with a seal formed between the horizontal partition 28 and the first surface of the rotor which rotates. The entrained flow region formed inside the partition acts a cyclone separator and guides the flow into the subsequent rotor. Therefore, the incoming stream is directed to an inlet of the rotor. The steam then passes through channels in the rotor that terminate at the exit nozzle 64. As explained more fully below, the resulting thrust of the ejected spent steam and droplets then turns the rotor.

The exhaust then enters the space between the downstream side of the rotor and the next vertical partition 84, confined by the seal 80. The exhaust then enters an intercooled compressor 82, which exits on the downstream side of the vertical partition 84. The partially compressed exhaust then follows the process steps described above for the first rotor. The exhaust from the second stage then enters the third stage, etc. FIG. 1 shows three representative stages 32, 34, and 36 within housing 30, but differing number of stages can be used. Each stage has a rotor 50.

Following conventional turbine practice, the respective ratios of inlet pressure to outlet pressure are approximately the same across all stages. For example, the starting design ratios of the pressures, in atmospheres are 3:1 in the first stage, 1:0.3 in the second stage, and 0.3:0.01 in the last stage prior to compression for recycling back to the inlet. Drainage outlets 42, 44, 46 for each stage remove condensed water that can be returned to the boiler to be converted to steam and reused in the system. The rapidly spinning rotor housings entrains the droplets in the exhaust, thereby acting as a cyclone separator to feed the condensate to the respective drains.

When pressure is reduced to a level that further expansion is not practical, for example less than 0.1 atm, the remaining exhaust steam may be recycled though conduit 16. The overall recycling configuration is depicted in FIG. 1. The process begins with a recirculation compressor 88 located after the last power rotor stage 36. The compressed steam then passes through return line 16 and enters the mixing chamber 12.

The load is placed across the shaft seal 26 immediately after the recirculation compressor 88. The rotation of the shaft can be utilized in any one of a number of applications. One such application is having the rotor 22 drive a generator 23 to produce electrical power.

Additional components are required for system startup and enhanced operation. The first such component is a vacuum source to extract air and contaminated vapors at startup. Because of the presence of large volumes of steam, a conventional ejector 90 is one possible vacuum source; mechanical piston pumps, turbine pumps, and small cooling towers are possible alternatives. After sufficient vacuum has been obtained, it is necessary to spin the rotor sufficiently rapidly to generate sufficient compression. Following conventional Brayton cycle approaches, a convenient starting technique is to reverse the generator using an external voltage source, thereby temporarily converting the generator to a starter motor. Finally, to aid in both starting and online efficiency gains, small heat exchangers can be added to the system. One such exchanger 48 is used in the recycled exhaust stream to capture residual heat, while also possibly improving the vacuum. Such exchangers are much smaller than the cooling towers of conventional power plants, and can thus be operated with small amounts of either water or air even in arid environments.

Figure 2:
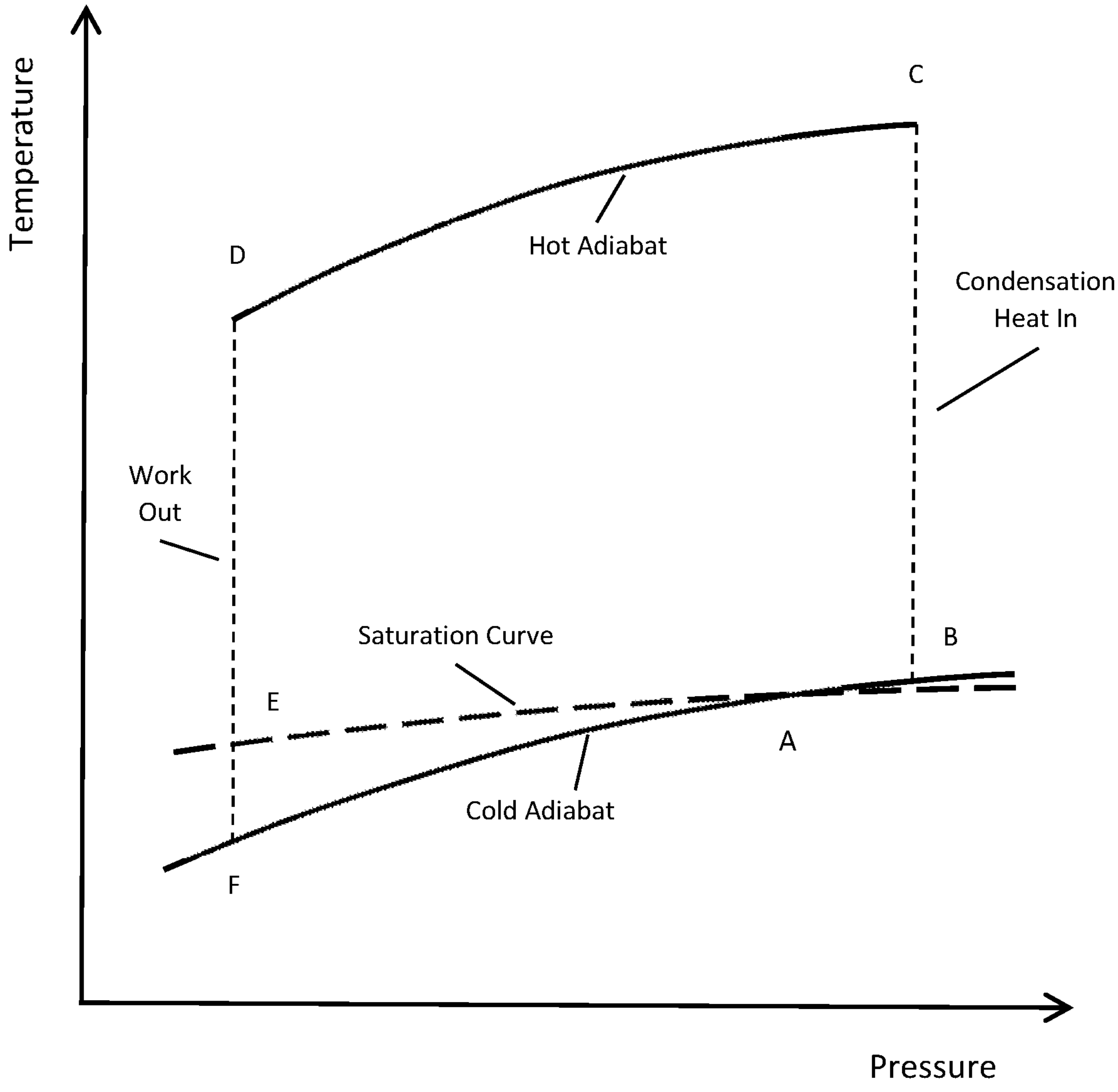
FIG. 2 is a graph of the temperature and pressure over a single system cycle.

FIG. 2 summarizes the unique thermodynamic cycle for the system shown in FIG. 1. The cycle starts at the pressure and temperature of the incoming steam source 10. Because the steam is saturated at this point, the "Saturation Curve" of FIG. 2 provides the temperature at any given pressure. Water at temperatures above this curve is in the vapor phase, while water at temperatures below this curve is in the liquid phase. While steam is disclosed as the working fluid, other low boiling point fluids such as low order hydrocarbons (propane, butane, pentane, hexane), silicone oils and fluorocarbons can also be used as working fluids.

Because one application of the present invention is as an add-on module to a conventional utility steam turbine, representative starting values for pressure and temperature can be obtained from the respective exhaust measurements of existing commercial equipment. The exhaust pressure for Point A is thus about 3.0 atm, and from the Saturation Curve in FIG. 2, the starting temperature is therefore about 407 K.

The intercooled compressors 82 and the self-compression segment of the rotor 50 then raise the pressure, while the temperature increases along the "Cold Adiabat" of FIG. 2 from Point A to Point B. The shock induced condensation in the expansion part of the rotor 50 described below then releases heat, thereby raising the temperature isobarically to Point C. This process is analogous to the compressor and combustor components of a conventional Brayton gas turbine cycle. The hot, high pressure steam then expands along the "Hot Adiabat" of FIG. 2, terminating at Point D. This process step occurs in the later expansion part of the rotor 50 as described below. This step is analogous to the adiabatic expansion that occurs in a conventional Rankine steam cycle. The new cycle to this point thus consists of a unique combination of parts of both Brayton gas and Rankine steam turbine cycles.

The next three steps in the cycle are unique to the present invention. First, because the exhaust from the rotor 50 is essentially stationary as it leaves the exit nozzle 64, as described below, the static temperature of the supersonic steam in the rotor immediately becomes the stagnation temperature of the resulting essentially stationary exhaust contained in the housing 30. The difference between the stagnation temperature from a fixed bed test stand nozzle and the stagnation temperature of the exhaust ejected from the moving rotor is shown as the isobaric drop from Point D to Point E, where Point E is slightly below the "Saturation" curve to account for nucleation effects above the Wilson line. The heat associated with this temperature difference is converted to output work, as seen in FIG. 2 as the rotor 50 turns the shaft 22 against the load 23.

Of course, the above analysis does not strictly hold in actual practice. Instead, the flows are not completely uniform at any point, thereby yielding variations in local droplet and vapor mixtures. Also, multiple processes occur simultaneously, such as heat release during condensation, while the rotor extracts heat to do work. The net result, however, is that the above analysis is sufficient to predict the needed average quantities at any one step.

Under these considerations, the conditions at Point E are sufficiently close to the Saturation and Cold Adiabat curves to start another cycle with Point E acting essentially as a new Point A. The above cycle can then be repeated as often as needed, proceeding to sequentially lower starting pressures over stages 32, 34, and 36. The net result is a unique staging capability, as illustrated for the respective sequential pressure ratios descried in the above 3:1 example.

Finally, after the last stage the remaining vapor is compressed by the recirculation compressor 88 to be returned through the recycling conduit 16 to the mixing chamber 12. With the previously mentioned small heat exchangers 48, the temperature at the final Point E can be cooled to approximately Point F on the Cold Adiabat curve. Simple adiabatic compression then raises the vapor pressure and temperature from Point F back up to the original conditions at the starting Point A, which are again the conditions of the mixing chamber 12.

Note that the above cycle analysis does not include the removal of the condensate at the drainage pipes 42, 44, and 46: the removed liquid is not needed in the ideal gas law calculations that govern the behavior of the steam (vapor). In looking at the complete cycle, however, the progressive removal of liquid decreases the volume of vapor to be processed in each successive stage. Because compression of the small final exhaust steam mass therefore requires much less work than the work obtained from expansion of the much larger initial mass, the overall energy balance of the complete system is thus quite advantageous.

Figure 3:
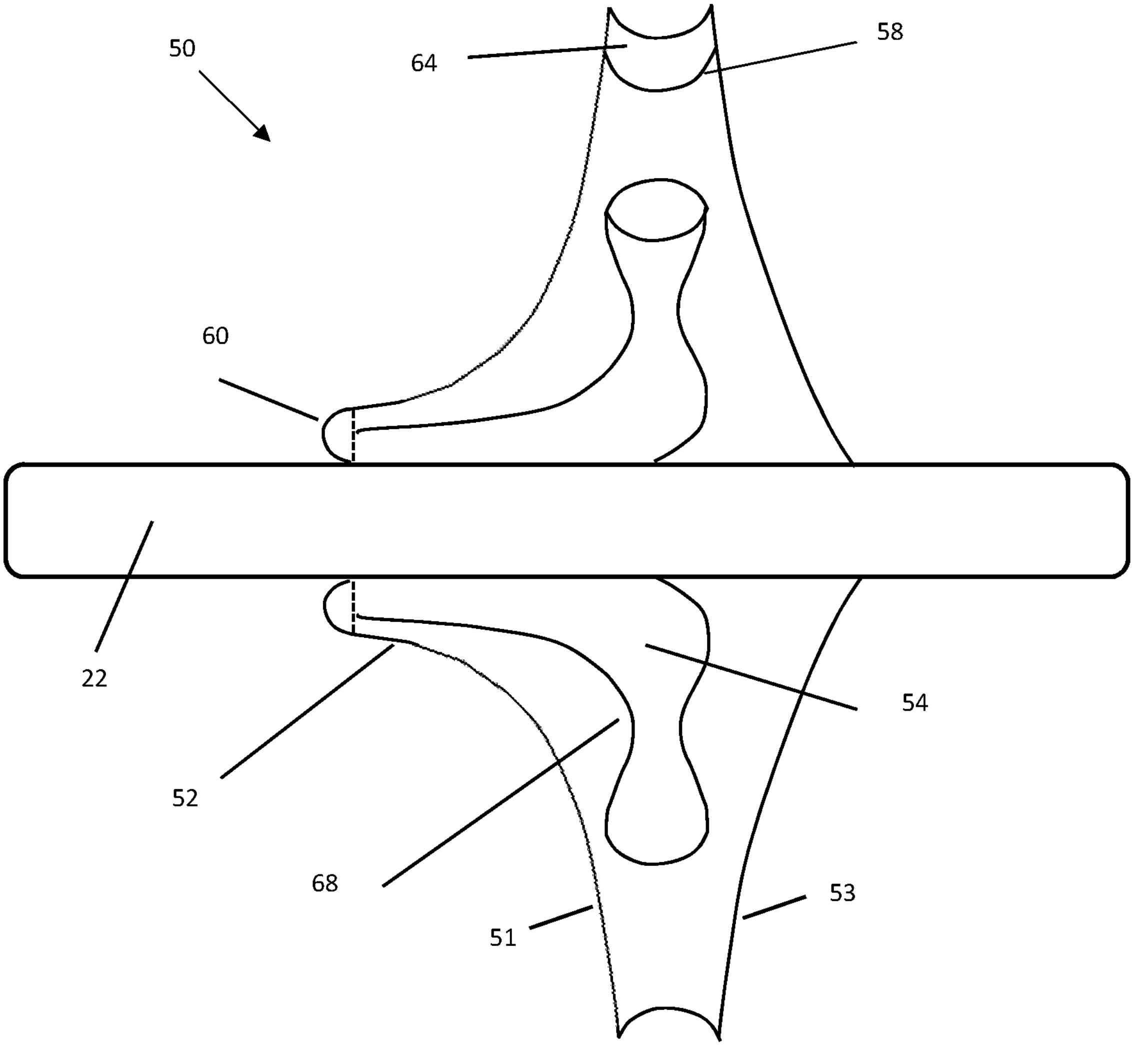
FIG. 3 is a vertical cross section view of a rotor along the central axis of the shaft.

FIG. 3 illustrates the details of a single rotor 50 within one stage. The overall design for this rotor follows from de Laval's general rule for optimum efficiency: bring the fluid into the turbine slowly and steadily, extract the work with minimum losses, and then release the exhaust as slowly and steadily as possible.

Using de Laval's approach, the first component in FIG. 3 is the inlet scoop assembly 60. This assembly consists of a set of blades that are mounted on the central shaft 22, much like a motor boat impeller, that help funnel fluid into inlets of the rotor. The scoops open in a direction tangential to the shaft 22. The upstream side of the scoops is immersed in the relative stagnant, high pressure steam and droplet mixture contained within the housing 30. The downstream side of the scoops is parallel to the shaft 22. As the shaft 22 rotates, the scoops 60 draw in the ambient mixture, and then direct the flow parallel to the axis of the shaft 22. The scoops 60 are located close to the central shaft 22, thereby minimizing the velocity of the scoops, which in turns minimizes the erosion of the scoops due impact with any water droplets that may be entrained in the working fluid. The immediate result is that the system thus satisfies de Laval's ideal inlet condition.

The next step in de Laval's overall technique is to extract the work with minimal losses. In the present invention, this step involves directing the working fluid through a set of spiraling internal channels, as described below for FIG. 4. The remaining de Laval condition is to eject the exhaust with minimum losses. The underlying principle in the present invention is that the exit nozzle at the rotor periphery behaves like the nozzle of a rocket. Specifically, maximum efficiency occurs when the exhaust velocity out of the nozzle is equal and opposite to the rocket velocity, thus leaving the exhaust suspended at rest in space. The opposite case consists of firing the nozzle on a fixed test frame, thus producing no power while wasting maximum kinetic energy in the high velocity exhaust.

Applying this simple approach to the present invention thus requires the rotor velocity at the peripheral exhaust nozzle to match the spent steam exhaust velocity. The discussion of the static versus stagnation temperatures above for the thermodynamic cycle shown in FIG. 2. Using standard compressible flow relations for steam at the conditions described above, however, yields supersonic exhaust velocities. Although such speeds are necessary for the shock induced condensation described below, they also generate severe centrifugal forces on the rotor.

Figure 4:
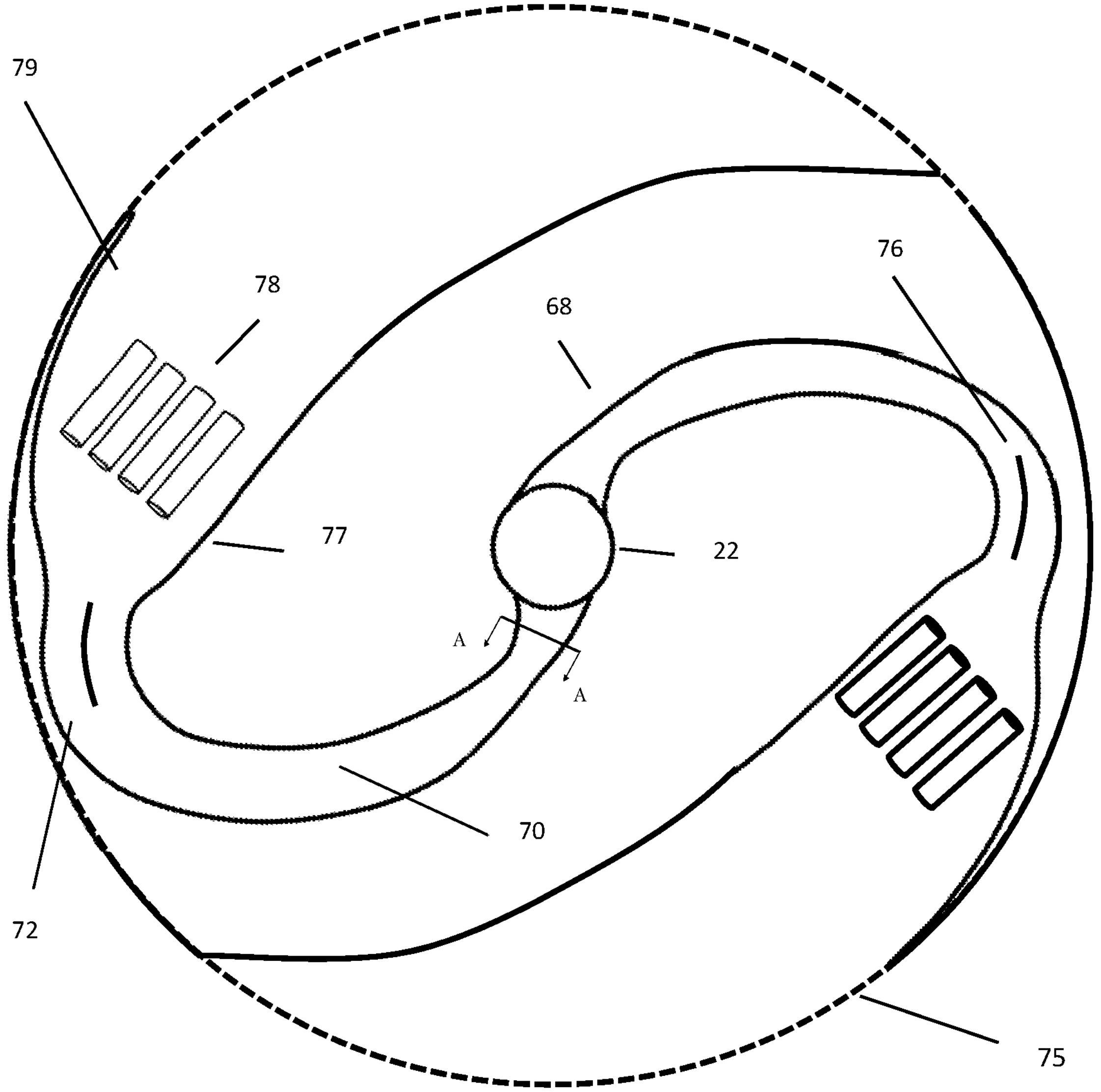
FIG. 4 is vertical cross section view of a rotor perpendicular to the axis of the shaft.

The design of the rotor thus reduces to achieving extremely high rotational velocities without exceeding the mechanical limitations of the material used to build the rotor. FIGS. 3 and 4 show the point of major concern: the area near the shaft 22. On the downstream side of the rotor—opposite to the inlet described above—the rotor body is essentially solid extending from the central axis 22 to the periphery, with the wall thickness in the axial direction greater near the axis, while thinning towards the periphery. This geometry follows from the well-known design of high speed flywheels that are commercially used for power storage.

A similar approach is used on the upstream side of the rotor, but in this case, the rotor also includes the channels 60 along the axis 22 to receive the working fluid into the rotor body. The immediate concern is that the channel cannot support the rotor mass extending radially from the periphery down to the channel location.

The conventional approach to this problem is to bring the working fluid in through a hollow central axis, and then turn the fluid radially outward. Unfortunately, the high mass flows at low pressures required for the present invention would make a hollow central axis too large to be practical;

furthermore, there would be the problem of supplying the downstream stages with the output from the upstream stages.

To avoid these problems, the length of the inlet channel is extended in the upstream direction in the present invention. Using the definition of Young's modulus, this extended section 52 thus provides the additional material required to support the inlet wall, despite the presence of the inlet channels.

In the space bound by the upstream and downstream walls, the channels turn outward from a central plenum 54. Multiple channels from this plenum 54 then extend towards the exit nozzles at the periphery. At first the path from the plenum to the periphery is essentially radial outwards, commonly referred to as an orange section geometry. In this region there is only minimal unsupported centrifugal loading on the path walls.

At greater distances, however, the path becomes spiral in the plane perpendicular to the rotation axis 22, as shown in FIG. 4. At this point the spiraling channels enter the plane parallel to the rotation axis 22, as shown in FIG. 3. The transition may occur near the throat 68, but this is not a limiting requirement. The concern at this point is that the centrifugal force can become sufficiently great to collapse the channel walls. Specifically, the force can collapse the wall components normal to the radius vector, leaving the parallel components undamaged, but still causing catastrophic failure. This effect is most severe at the periphery, where the forces are highest and the outer walls are essentially completely in the angular direction.

To minimize such damage in the present system, the wall components in the normal direction are formed as catenary arch segments 58. Because catenary arches are known to be extremely strong, the modified walls can thus withstand unmatched centrifugal forces. FIG. 3 shows representative catenary curves as one channel begins to spiral out of the reference plane, while a second channel emerges from this plane at the exit nozzle.

Figure 5C:
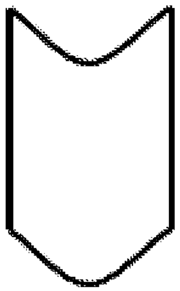
FIG. 5*a*-5*c* are cross sectional views of the channels in the direction of fluid flow.
Figure 5B:
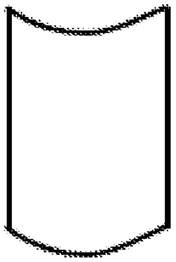
Figure 5A:
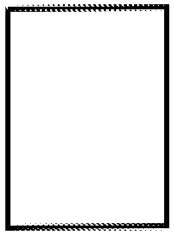

FIGS. 5*a*-5*c* shows the catenary sections as a function of distance from the axis. FIG. 5*a* is a cross sectional view perpendicular to the direction of flow, as indicated by line A-A of FIG. 4. FIGS. 5*a*-5*c* are at different points along the channel and not necessarily at the point of the line A-A. Near the inlet, the cross sections of the sidewalls are essentially flat because the centrifugal force is at a minimum in this region. FIG. 5*b* is a cross section at a point further along the channel, the walls are progressively more curved to counter the increasing centrifugal force. As seen in FIG. 5*b*, one sidewall is concave and the other sidewall is convex. Finally, the catenary curvature reaches a maximum at the rotor periphery to counter the maximum centrifugal force. The catenary curvature 58 at the outlet is seen in FIG. 3. The cross section is wider as the distance from the center axis increases, as seen in FIG. 4, so that the aspect ratio of the cross sectional views in FIGS. 5*a*-5*c* are not to scale. In other words, the distance between the sidewalls of FIG. 5*c* would be greater than a distance between the sidewalls of FIG. 5*a*. The top walls and bottom walls of the channel, which are spaced form each other in a direction of the center shaft, remain flat. FIGS. 5*a*-5*c* demonstrate how the sidewalls increase in curvature with the distance from the inlet. An increase in curvature correlates to a decrease in the radius of curvature.

The rotor can be formed from two separate disks, milling out the center passages, and then joining the disks together to produce the desired channels. An alternative is to use additive manufacturing techniques to form an entire rotor in one step, and eventually even the entire turbine in one operation as 3-d printing technology advances. The major advantages of this approach are (1) the ability to make prototypes rapidly and inexpensively, (2) routine manufacture with inherent quality control, (3) high precision even for complex shapes, and (4) strength improvements due to one piece construction and the inherently greater strength of printed over machined components.

FIG. 4 illustrates a cross section view perpendicular to the shaft 22 of a rotor 50. Two channels are shown in FIG. 4, extending from the center shaft 22 to the rotor periphery. (With only two channels, a plenum is not needed and the spiral arms transition to an axially extending section leading to the upstream edge of the rotor, having an inlet for each channel/ As described above, the pressure and temperature of the working fluid decrease along these flow paths according to the standard laws of compressible flow fluid mechanics. The resulting mixture of vapor and condensed liquid then exit the nozzle at the local ambient pressure inside the housing 30, as contained by a sealed partition, thereby generating thrust on the rotor 50. In FIG. 1 this configuration can be used for the first stage 32. Using the above 3:1 stage to stage pressure ratio, the initial 3.0 atm input is thus reduced to about 1.0 atm.

This lower output pressure then becomes the input pressure for the second stage 34. This lowered pressure, however, greatly increases the volume of the working fluid, even after adjusting for condensation, work output, etc. This increased volume at progressively lower pressures requires increasingly larger channel diameters to maintain steady flow, analogous to the increasingly larger diameters of successive stages used in conventional, bladed steam turbines.

To compensate for the increasing stage to stage volume in the present system, the number of channels is first increased in successive rotors. For example, the second stage 34 can have six channels instead of the two channels used in the first stage. Likewise, the third stage 36 can have twelve or more channels, each larger than the channels of the first stage 32. This increase in channel number can continue until the channels are in contact with each other, so that the outer wall of one channel is also the inner wall of the adjacent channel. Under this arrangement the walls of the catenary arches shown in FIG. 3 slightly overlap each other to account for the different sizes of adjoining channels at any particular radius.

Increasing the rotor size for successive stages may cause the exit velocity for any given stage to not match the peripheral velocity of the rotor in that particular stage. Because the exit velocity depends on the pressure ratio, the exit velocities must be approximately equal if the pressure ratios between stages are equal. Unfortunately, equal exit velocities for rotors with different radii between stages would lead to severe instabilities across the central shaft. For example, the RPM for a 300 m/sec exit velocity in a 1 m diameter rotor drops by half for a 2 m rotor. The resulting mismatch in RPM would lead to extreme vibration, efficiency losses, and other problems. An alternative approach is to alter the operating conditions for the respective rotors, notably the pressure ratios.

As noted above for FIG. 3, the first part of the path from the rotating center shaft 22 towards the periphery is essentially a simple radial outflow section. If this radial outflow continued straight to the periphery, the motion of the rotor would strongly compress the working fluid due to Coriolis effects. Because the resulting compression cannot be completely recovered in the nozzle, the desired high de Laval efficiency cited above can be realized only if the compression is minimized. The path shown in FIG. 4 immediately beyond the relatively straight initial section is therefore curved slightly over a sweeping arc towards the periphery. Appropriate values for the arc curvature can be calculated by routine experimentation and known techniques.

FIG. 4 shows additional detail of the throat 68 that is roughly in the middle of the radially extending portion. The throat has a decreasing cross section followed by an increasing cross section. The flow beginning at the axis 22 begins at low velocities. As the walls converge, the flow accelerates, reaching Mach 1 at the narrowest point of convergence. The flow then continues to accelerate as the channel walls diverge, thus becoming supersonic.

In conventional, ideally expanded systems the flow would continue to accelerate until the exit pressure matches the ambient pressure and the flow is ejected from the nozzle. The static pressure and temperature would both decrease along this path. In steam flows, the temperature drops until the static pressure is below the saturation point, thus yielding a supercooled (or undercooled) state. Lacking dust or other nucleation sites, the temperature continues to drop to the Wilson line, where homogeneous nucleation occurs. Rapid droplet growth then occurs, releasing heat that warms the vapor back to slightly below the saturation curve. Conventional nozzles have a converging angle of about 30 degrees and a diverging angle of about 15 degrees. These sections are smoothly converging to the narrowest point at the throat and then smoothly diverging.

In the present system, this droplet growth can occur in the downstream expansion zone 70 at a length several times the throat diameter. The cross sectional area of the downstream expansion zone 70 increases in the direction of fluid flow. The degree of condensation varies with the rate of chamber expansion, typically reaching only about 5% at best. However, at high rates of expansion, the heat release can be so great that the system undergoes "condensation shock" in which the flowing stream experiences thermal blocking. Condensation shock is not a true shock wave because there are no actual pressure discontinuities across regions moving at high speeds across the flow field. Nevertheless, the term shock is used because the system mimics some features of actual shock behavior.

Although condensation shock yields some droplets, the low yield of this process and possible thermal choking limit its use. Instead, the present system uses other techniques to produce shock waves. Common techniques include underexpanded and overexpanded nozzles, rough channel wall surfaces, changes in cross section (circular to rectangular), strips (gaps) in the walls, flow along a convex Prandtl-Meyer curvature, and obstructions (wedges, cones, miter guides, etc.) in the flow path. The underlying principle in each of these processes is that the low pressure zones of the induced shock wave are sufficient to produce condensation, even at conditions that would otherwise be inadequate for droplets to form and grow. In the steam turbine industry, this phenomenon is referred to as nonequilibrium condensation. This situation commonly occurs downstream of the rotating blades near the turbine exit, where the velocities are high and the steam is near saturation.

In FIG. 4, induced shock wave condensation occurs in the sharp bend 72 at the end of the initially radial channel. This sharp convex curve induces a Prandtl-Meyer expansion, yielding condensation as commonly observed along the cockpit and trailing fuselage when supersonic aircraft cross the sound barrier. To stabilize the flow through the channel, miter guide vanes 76 are located through the sharpest parts of the curve. These vanes extend through the height of the channel to also provide support of the top surface of the channel during the additive manufacturing process. Furthermore, these vanes also improve the rigidity of the assembled rotor. The immediate benefit of this first induced condensation is some heat generation and recovery, along with the formation of at least some condensation nuclei to seed any subsequent condensation processes.

One such process is the immediately downstream "overexpanded" nozzle 79. Overexpansion refers to nozzle walls 77 diverging to create an increase in cross sectional area more rapidly than the ideal expansion case described above. In such nozzles, the expanding flow first separates from the walls, leaving a penetrating jet that is surrounded by a relatively stagnant sheath. Shock waves in the boundary between the penetrating jet and the surrounding sheath then produce substantial amounts of condensation. For a given temperature and pressure of the fluid traveling through the turbine, overexpansion depends on the rate of expansion after the throat. As shown in FIG. 4, the diverging section has a rapid increase in cross-sectional area to induce flow separation, thereby obtaining the overexpansion which causes the desired condensation.

The effective length of the resulting condensation zone is typically at least eight times the penetrating jet diameter. For the present invention, the effective length for a 500 MW turbine would therefore be several meters long, which would require a rotor diameter that would be much too large for even the biggest currently available 3D printing equipment.

To reduce this excessive length, smaller tubes 78 are placed in the overexpansion nozzle 79. These smaller tubes 78 have proportionally smaller effective lengths, thereby shortening the condensation zone and thereby completing the condensation process within a rotor size that can be readily manufactured and used in practice.

For maximum space utilization, banks of these tubes 78 can be stacked on top of each other in the overexpansion module 79, thereby completely utilizing the available space even within the catenary arches. This arrangement thus provides a uniform ejection stream, avoiding the otherwise wasted space around a single, large penetrating jet.

For ease of manufacture, the inlet of each individual tube has a narrow port constriction, thereby initiating the overexpansion process on a small scale. Assemblies of these tubes can be incorporated as part of the additive manufacturing process, or built separately in a module that can be inserted into the periphery of the rotor body. In either case, the support material around the tubes seals the assembly, thereby constraining the working fluid to pass through the tubes without leaking around the tube periphery. Finally, adjoining tubes within the assembly can be staggered lengthwise during manufacture to provide complementary spaced nodes of condensation, thereby improving overall flow uniformity.

Figure 6:
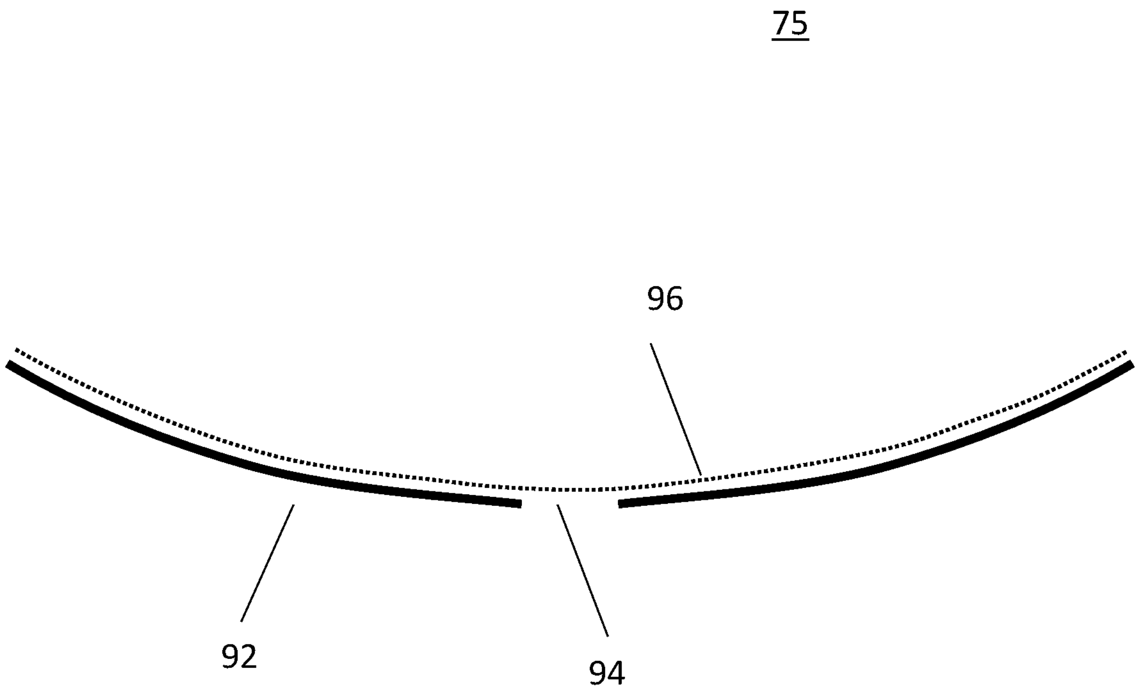
FIG. 6 is an enlarged view of a filter at the channel outlet at the periphery of the rotor.

The curvature at the outlet provides a smooth transition from the high velocity of the exhaust stream to the essentially stationary surrounding gas. The filter at the outlet dampen the shock waves that are inherently present in transonic and supersonic flows. Because the output of the tube assembly may include large numbers of water droplets, a filter 75 is placed downstream of the tubes 78. The filter traps the condensing droplets, which are then subsequently removed from the system The filter can be a grate, grid or mesh over the outlet. As seen in FIG. 6, the filter may be a plate 92 covering the outlet of the channel and having vertical slots 94 extending in a direction of the center shaft 22. The plate may be separate or integrally formed with the end wall of the rotor Although only one slot is depicted, a plurality of slots would be formed to allow for the exhaust of fluid with creating back pressure. The ratio between a width of the slots and the distance between slots can be 3:1. Therefore, slots of 1 cm would be separated by 3 cm of the plate. Additionally, a filter media 96, such as a screen, can be placed on the inner surface of the plate to cover the slots. The screen help smooth the overall flow and trap droplets, while still allowing shock suppression. In addition, vent holes can be formed in the top and bottom walls at the end of the channel, such as near the plate 92. These vent holes would extend in the direction of the center shaft 22 and extend through the first surface 51, a second surface 53 of the rotor. This allows another path for the exhaust. These vent holes could also be covered in filter material.

Filters can also be placed as needed throughout the entire condensation region, but the indicated position is particularly effective because it is just beyond the effective length of the high condensation overexpansion zone.

In summary, the result of flow through the channels of each rotor creates power by (1) introducing a fluid is at approximately saturation conditions to the rotor, (2) compressing the fluid if the incoming pressure is low compared to the specified outlet pressure, (3) expanding the fluid (adiabatically) to a supercooled state, (4) inducing condensation, (5) raising the pressure and temperature of the working fluid with the heat released by the condensation step, (6) expanding the heated and pressurized fluid to produce work, thereby cooling the fluid and reducing the pressure, (7) removing the condensate, (8) repeating steps 2 through 7 until the fluid is at the desired end condition, and (9) returning the high droplet content exhaust fluid back to the inlet to be mixed with fresh incoming fluid at step 1 and the process repeated.

The invention has been described with reference to preferred embodiments. Variation and modification would be apparent to one of ordinary skill in the art and the invention encompasses such variations and modifications.

What is claimed is:

1. A rotor, comprising:

a first surface and a second surface spaced from the first surface in an axial direction;

an end wall extending between the first surface and the second surface;

at least one channel extending in a radial direction between an inlet and an outlet in the end wall;

wherein the at least one channel includes a top wall, a bottom wall, a first sidewall and a second sidewall extending in the axial direction between the top wall and the bottom wall, and wherein the first sidewall and the second sidewall are curved in the axial direction between the top wall and the bottom wall.

2. The rotor of claim 1, wherein a curvature of the sidewalls of the at least one channel increases in a direction extending from the inlet to the outlet.

3. The rotor of claim 1, wherein the curvature of the sidewalls of the at least one channel increases continuously from the inlet to the outlet.

4. The rotor of claim 1, wherein a curvature of the sidewalls is a catenary curve.

5. The rotor of claim 1, wherein the first sidewall is convex curve and the second sidewall is concave.

6. The rotor of claim 1, further comprising a filter over the outlet.

7. The rotor of claim 1, wherein the at least one channel has a throat section, the throat section having a first section with a decreasing cross sectional area and a second section with an increasing cross sectional area, the second section creating an overexpansion nozzle.

8. The rotor of claim 1, further comprising tubes extending across the at least one channel.

9. A turbine, comprising:

a housing having a first end wall, a second end wall and at least one sidewall extending between the first end wall and second end wall;

an inlet in the first end wall;

a shaft extending through the housing;

a first partition dividing the housing into a first chamber and a second chamber, the first partition having an opening;

a first compressor in the opening in the first partition;

a rotor connected to the shaft in each chamber, each rotor having a first surface and a second surface, an inlet, an outlet and a channel extending between the inlet and outlet;

a first horizontal partition forming a conduit between the inlet in the first end wall and the first surface of the rotor in the first chamber;

a second horizontal partition forming a conduit between the opening in the first partition and the first surface of the rotor in the second chamber; and an exhaust in the housing.

10. The turbine of claim 9, further comprising a drainage conduit connected to each chamber.

11. The turbine of claim 9, further comprising a second partition forming a third chamber in the housing, the second partition having an opening;

a second compressor in the opening in the second partition;

a rotor in the third chamber, the rotor having a first surface and a second surface, an inlet, an outlet and a channel extending between the inlet and outlet; and a third conduit between the opening in the second partition and the first surface of the rotor in the third chamber.

12. The turbine of claim 9, a conduit extending from the exhaust in the housing to a source of steam.

13. The turbine of claim 9, wherein the channel of the rotor has an expansion chamber between the inlet and outlet.

14. The turbine of claim 13, wherein the channel of the rotor has a spirally extending section between the inlet and outlet.

15. A method of driving a rotor, comprising:

introducing a fluid at saturation conditions to a channel in a rotor, the rotor having a throat having a decreasing cross section followed by an increasing cross section;

overexpanding the fluid by the increasing cross section of the throat to a supercooled state;

inducing condensation;

raising the pressure and temperature of the working fluid with the heat released by the condensation step; and expanding the heated and pressurized fluid to produce work.

16. The method of claim 15, further comprising removing condensate.

17. The method of claim 15, further comprising compressing the fluid before expanding the fluid.

18. The method of claim 15, wherein inducing condensation comprises creating shock waves.

19. The rotor of claim 1, wherein the at least one channel curves between the inlet and outlet.

20. The rotor of claim 1, wherein the top wall and bottom wall of the at least one channel are parallel to each other.

* * * * *